Figure 3:
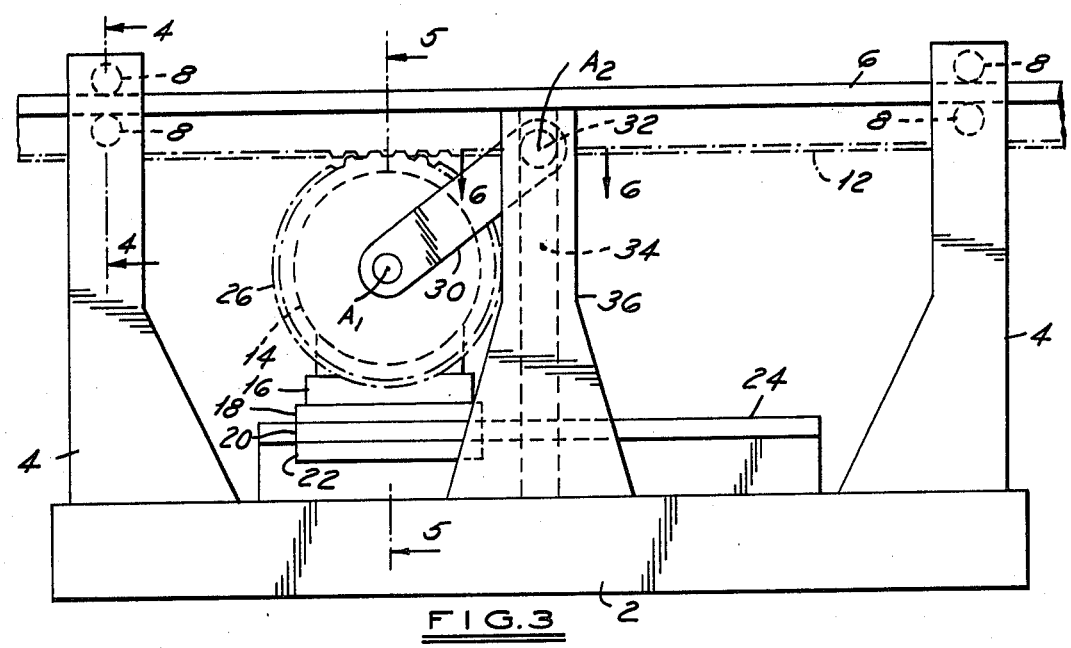

United States Patent [19]

Brems

[11] 4,244,233
[45] Jan. 13, 1981

[54] RECIPROCATING INDEXING MECHANISM

[76] Inventor: John H. Brems, 32867 White Oaks Trail, Birmingham, Mich. 48010

[21] Appl. No.: 867,333

[22] Filed: Jan. 6, 1978

Related U.S. Application Data

[63] Continuation of Ser. No. 621,960, Oct. 14, 1975, abandoned.

[51] Int. Cl.³ ............... F16H 27/02; F16H 21/16; F16H 21/18
[52] U.S. Cl. ............................ 74/89; 74/29; 74/45
[58] Field of Search ............... 74/29, 30, 31, 32, 34, 74/45, 46, 813, 825, 817, 89, 25

[56] References Cited

U.S. PATENT DOCUMENTS

| | | | |
|---|---|---|---|
| 1,788,098 | 1/1931 | Fuller | 74/45 |
| 1,803,864 | 5/1931 | Newman | 74/45 |
| 2,619,133 | 11/1952 | Durand | 74/45 |
| 3,089,345 | 5/1963 | Budlong | 74/45 |
| 3,105,497 | 10/1963 | Petri et al. | 74/813 |
| 3,429,195 | 2/1969 | Bassoff | 74/29 |
| 3,468,173 | 9/1969 | Fracke | 74/29 |
| 3,813,953 | 6/1974 | Wojtowicz | 74/29 |

FOREIGN PATENT DOCUMENTS 2106948  4/1972  France ........................... 74/29

*Primary Examiner*—Samuel Scott
*Assistant Examiner*—Wesley S. Ratliff, Jr.
*Attorney, Agent, or Firm*—Barnes, Kisselle, Raisch & Choate

[57] ABSTRACT

A reciprocating indexing mechanism for linear and rotary outputs which has an output member which inherently reaches a zero velocity at each end of a stroke independent of the input velocity and which utilizes an angular input mechanism, commercially available, which has a rotative movement greater than 180° but less than 360°. The resulting mechanism has versatile kinematic characteristics during the stroke with a smaller acceleration discontinuity at the ends of the stroke than comparable harmonic mechanisms.

21 Claims, 50 Drawing Figures

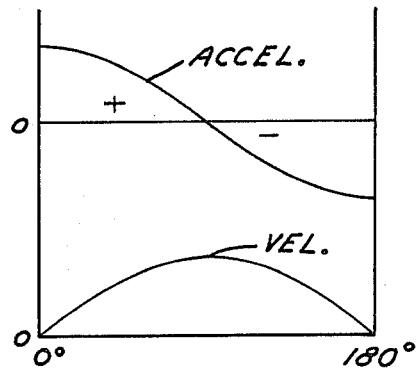
FIG.1
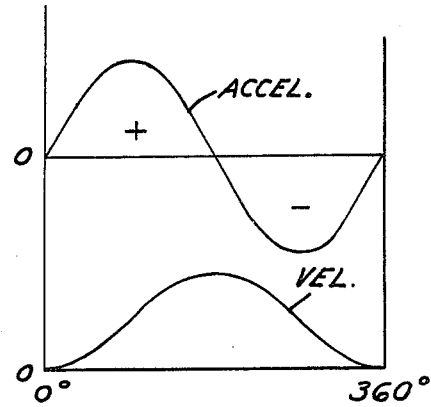
FIG.2
FIG.7  FIG.8  FIG.9
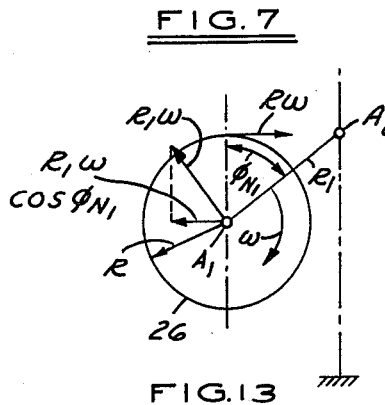
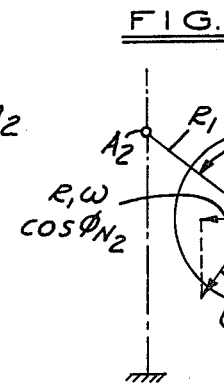
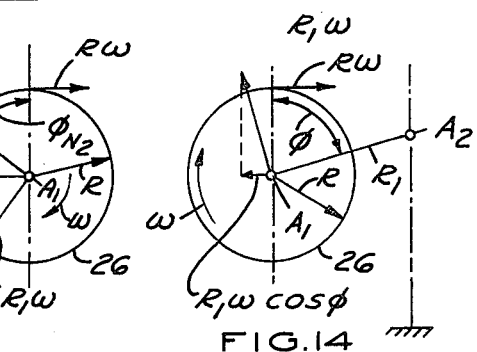
FIG.13  FIG.14
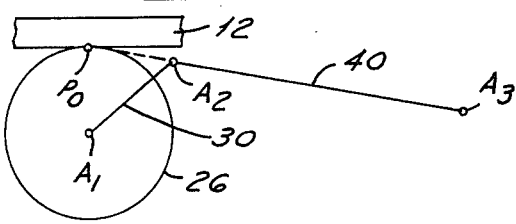
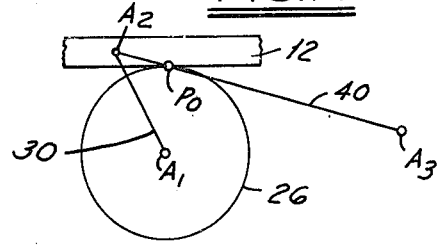
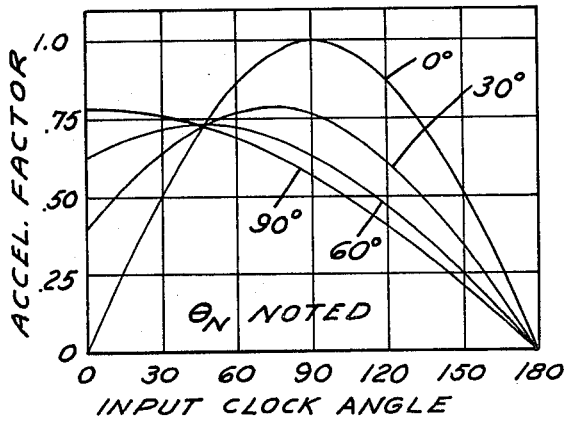
FIG.10
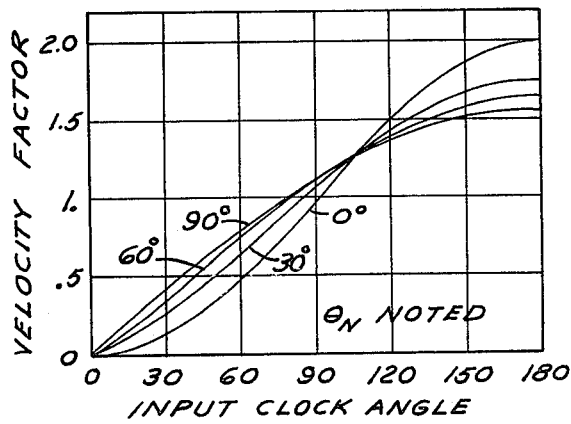
FIG.11

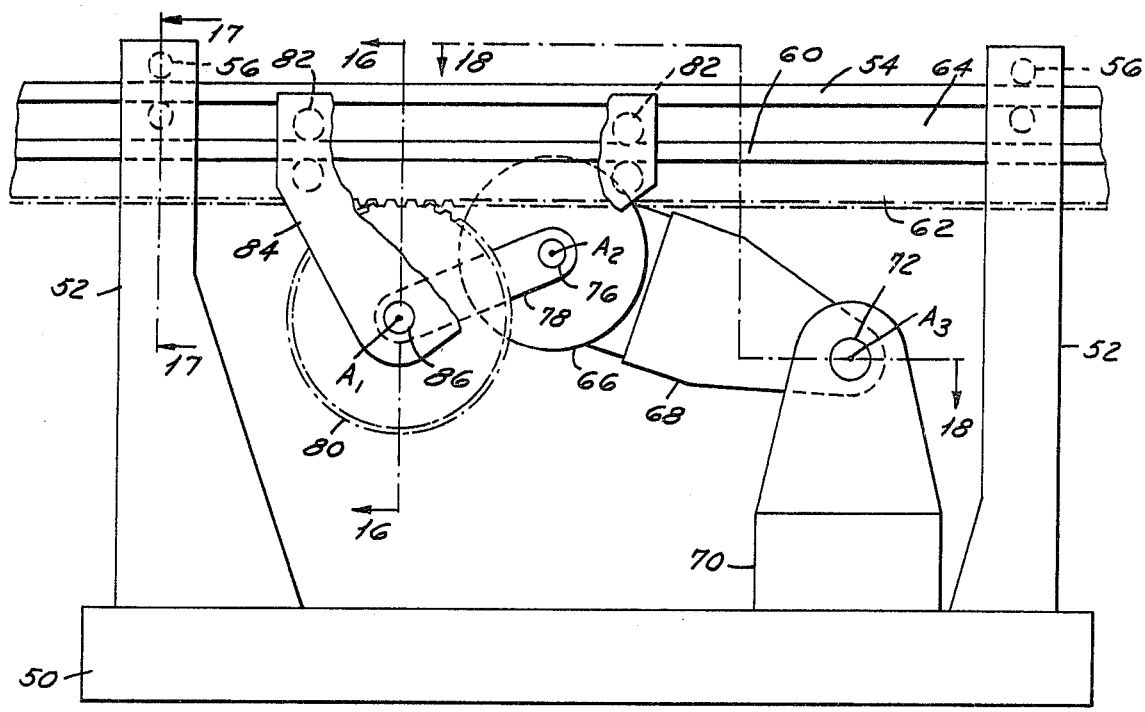
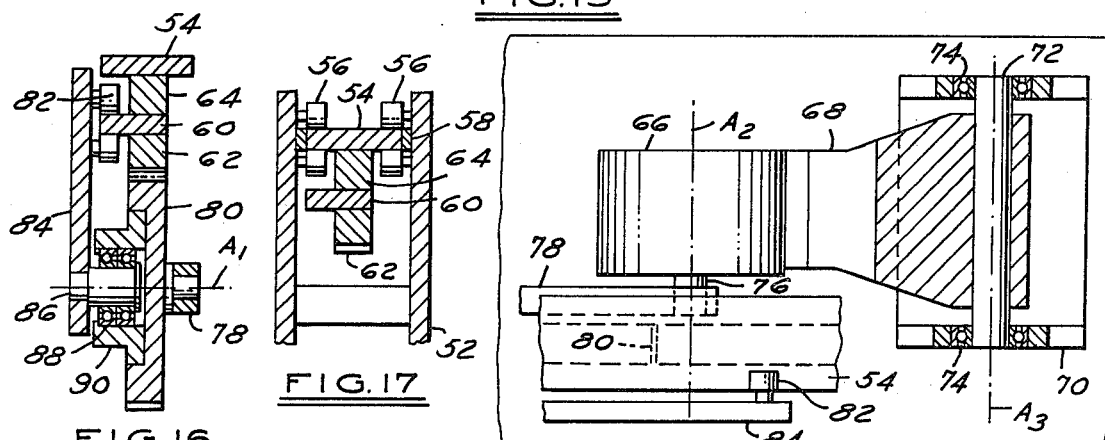
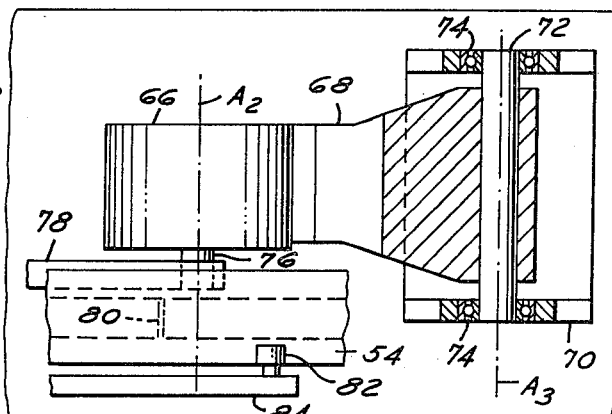
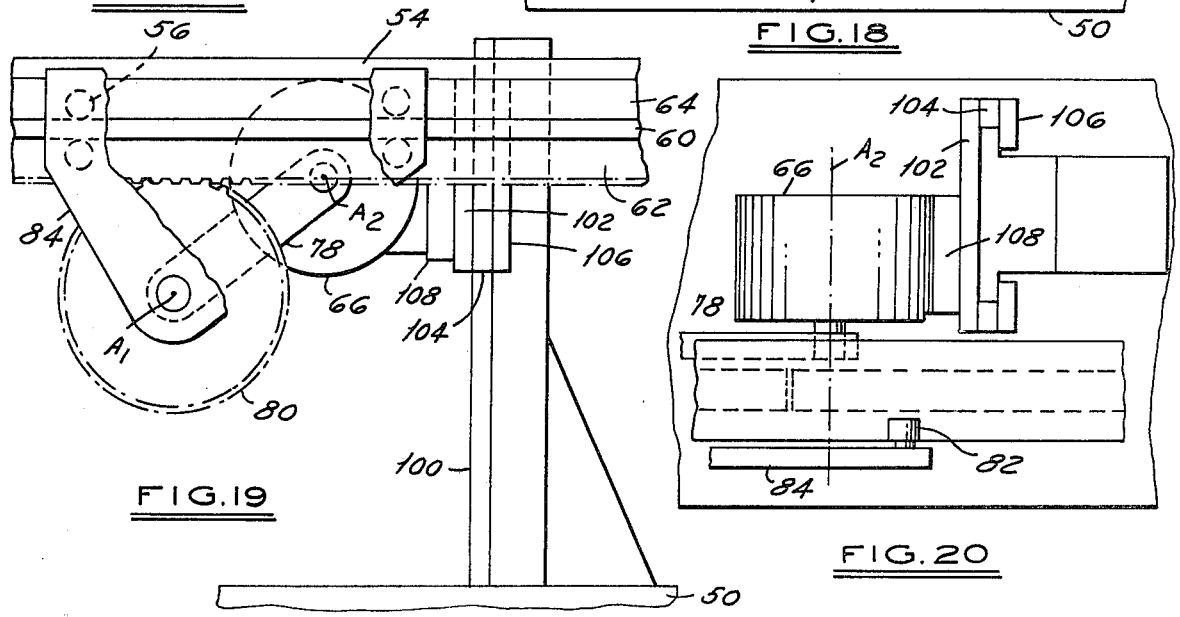

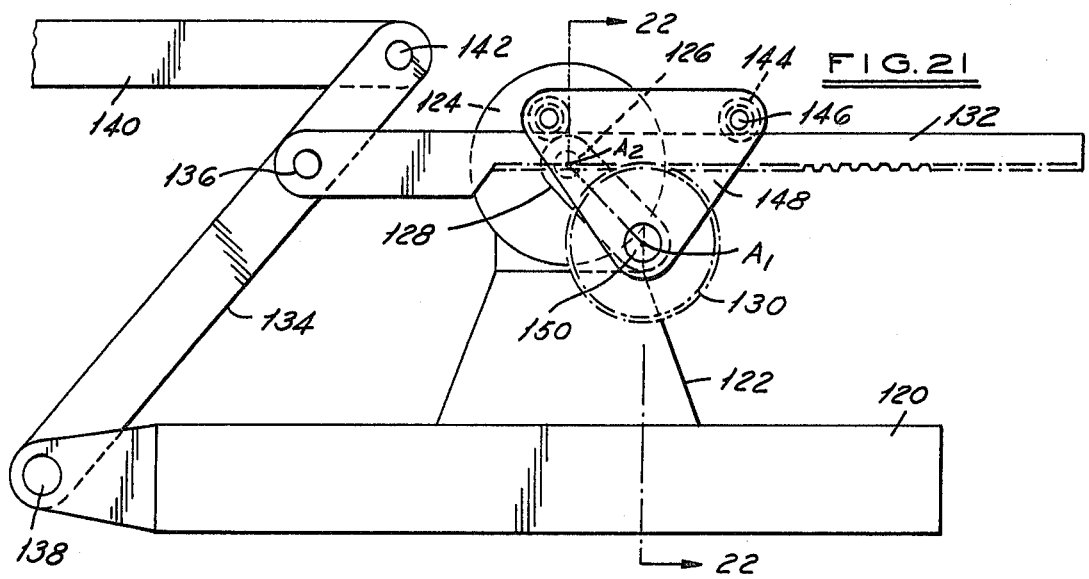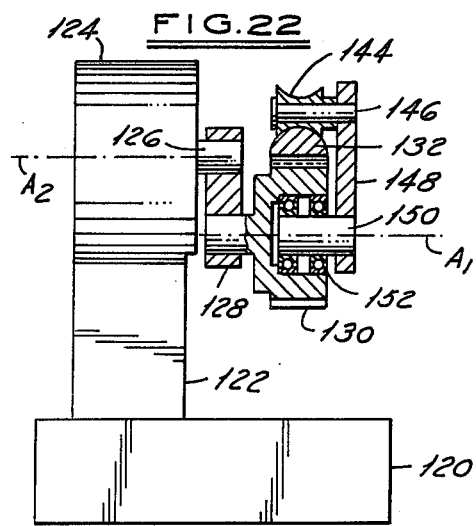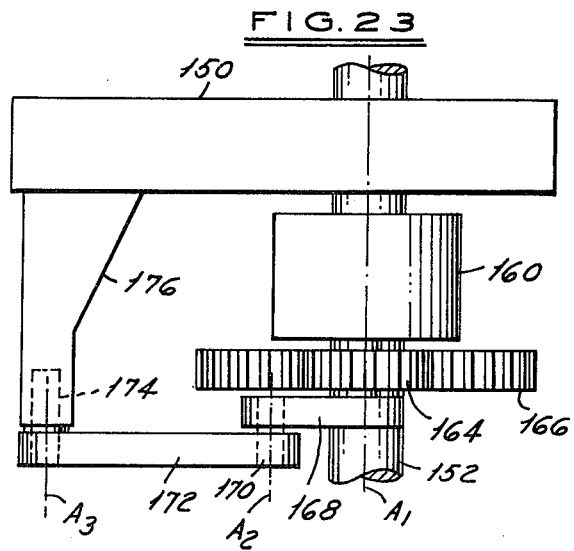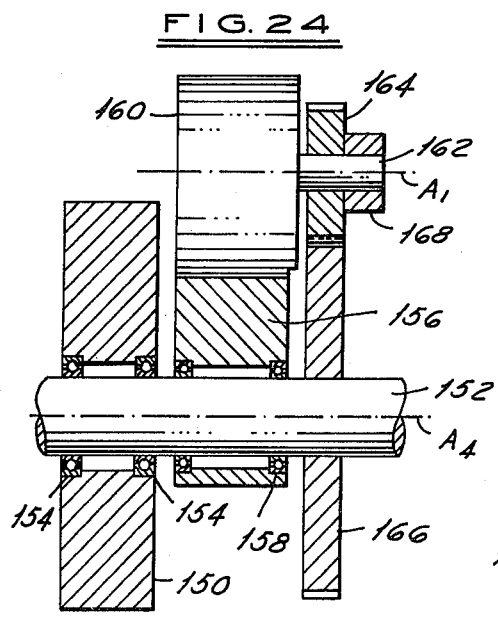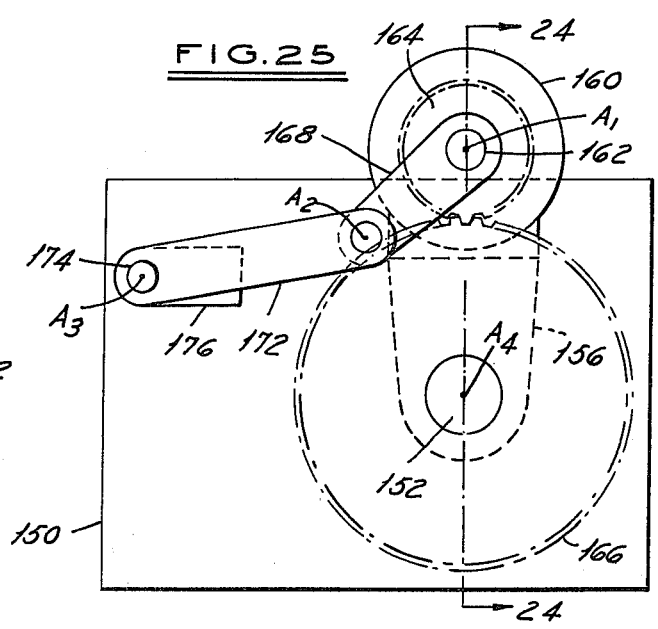

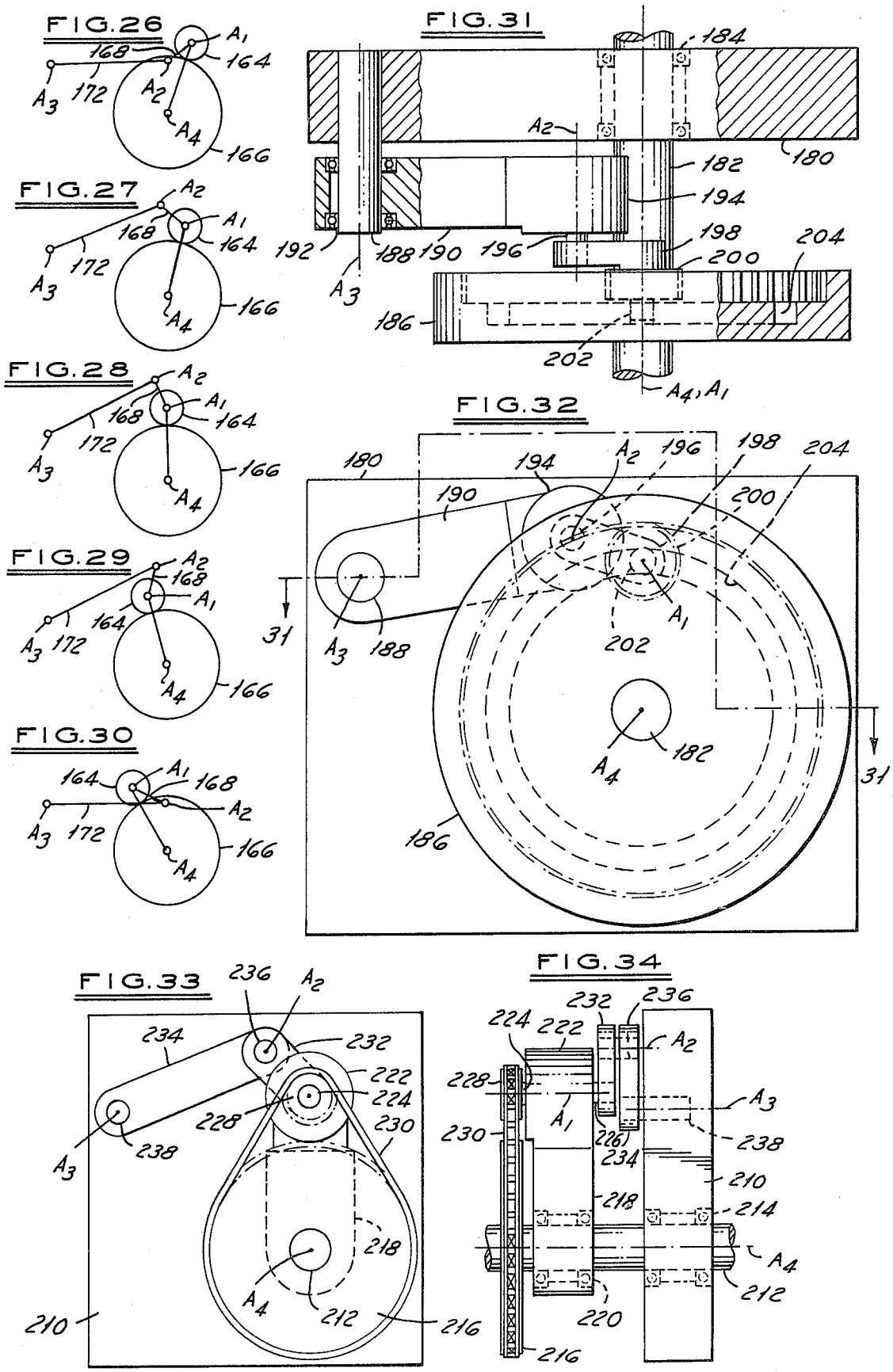

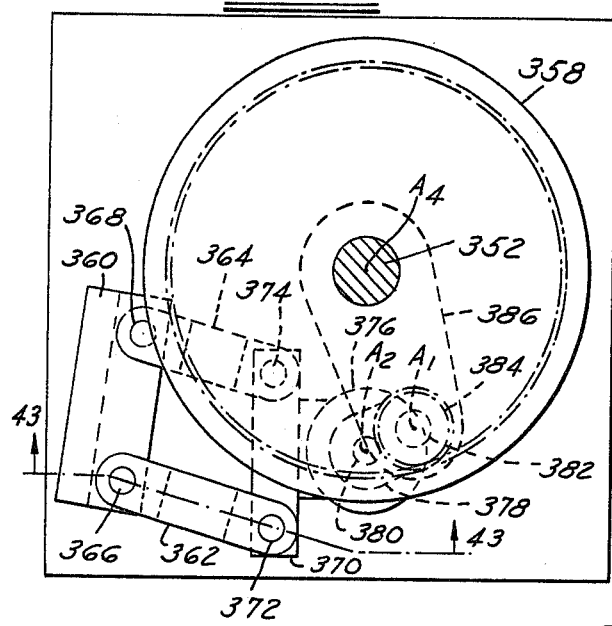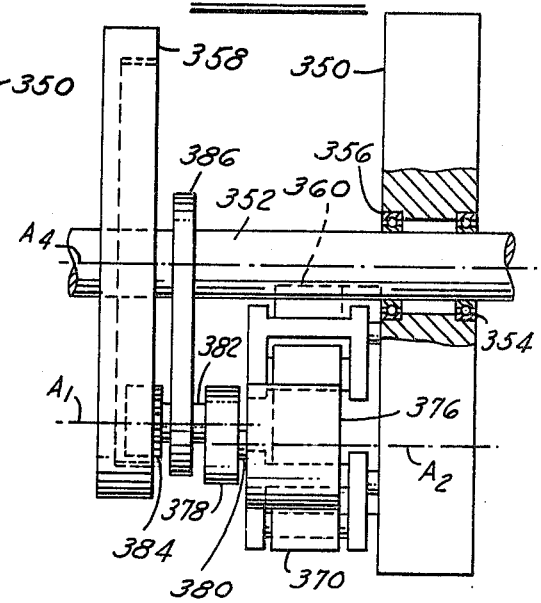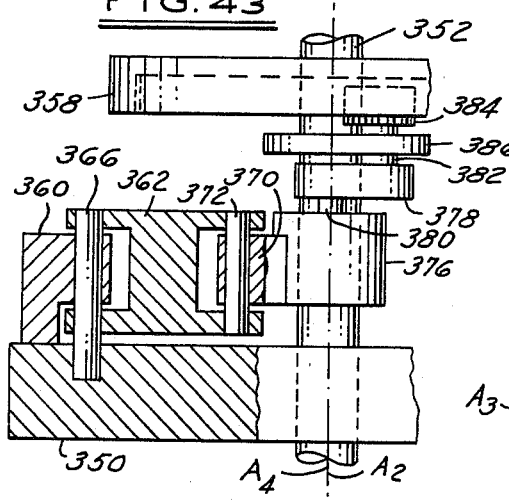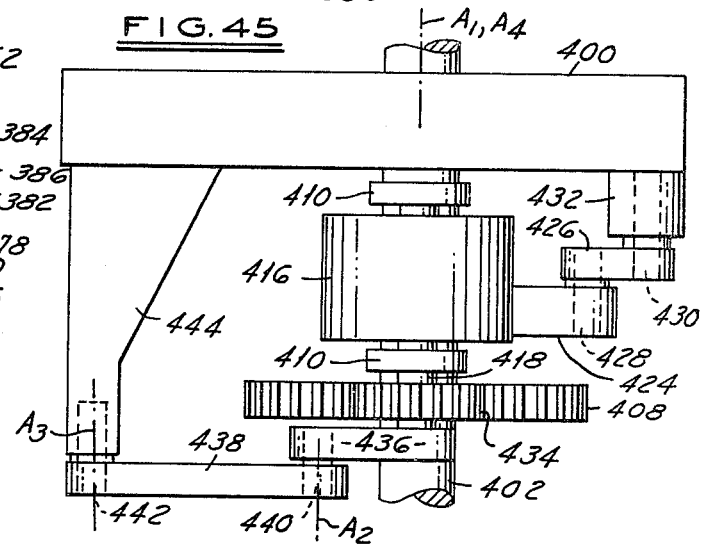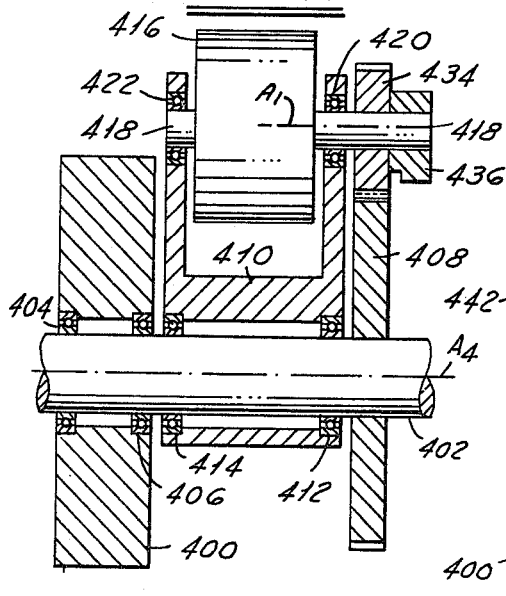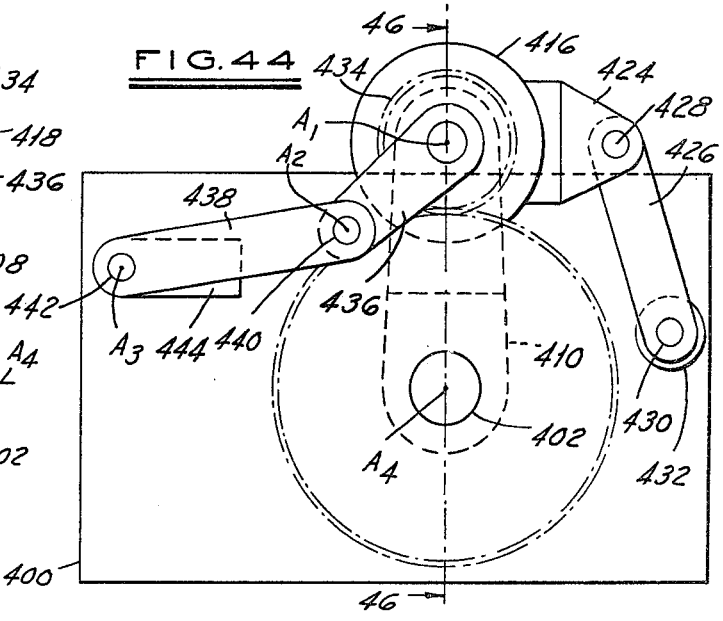

RECIPROCATING INDEXING MECHANISM

This is a continuation of application Ser. No. 621,960, filed Oct. 14, 1975, entitled "Reciprocating Indexing Mechanism", now abandoned.

This invention relates to a Reciprocating Indexing Mechanism for both linear and rotary outputs.

It is an object of this invention to provide a mechanism whose output member naturally reaches a zero velocity at each end of the stroke independent of the input velocity.

It is a further object of this invention to provide a mechanism which generates the aforesaid output movement utilizing an angular input movement greater than 180° but less than 360° permitting the use of commercial actuators within this range.

It is a further object of this invention to provide a mechanism having versatile kinematic characteristics during the stroke and with a smaller acceleration discontinuity at the ends of the stroke than comparable harmonic mechanisms.

Other objects and features of this invention relating to the details of construction and operation will be apparent in the following description and claims in which the principles of operation are set forth together with the best modes presently contemplated for the practice of the invention.

Drawings accompany the disclosure and the various views thereof may be briefly described as:

FIG. 1, a graph showing the velocity and acceleration of typical harmonic motion.

FIG. 2, a graph showing the velocity and acceleration of typical cycloidal motion.

FIG. 3, a side view of a mechanism for practicing the invention.

Figure 4:
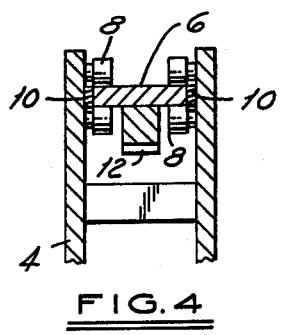

FIG. 4, a sectional view taken on line 4—4 of FIG. 3.

Figure 5:
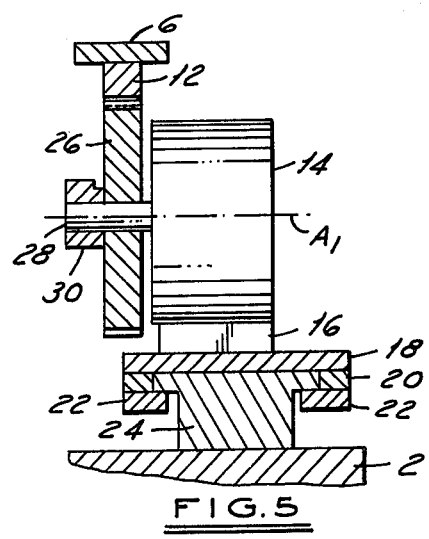

FIG. 5, a sectional view taken on line 5—5 of FIG. 3.

Figure 6:
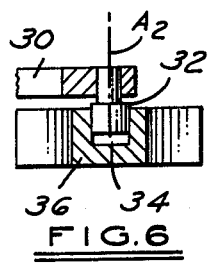

FIG. 6, a sectional view taken on line 6—6 of FIG. 3.

FIG. 7, a diagrammatic view of the mechanism at its starting position showing the velocity components.

FIG. 8, a diagrammatic view of the mechanism at its stopping position showing the velocity components.

FIG. 9, a diagrammatic view of the mechanism at some intermediate position showing the velocity components.

FIGS. 10 and 11, illustrate in graph form, respectively, the acceleration factor and velocity factor which can be obtained by the previously illustrated mechanism.

Figure 12:
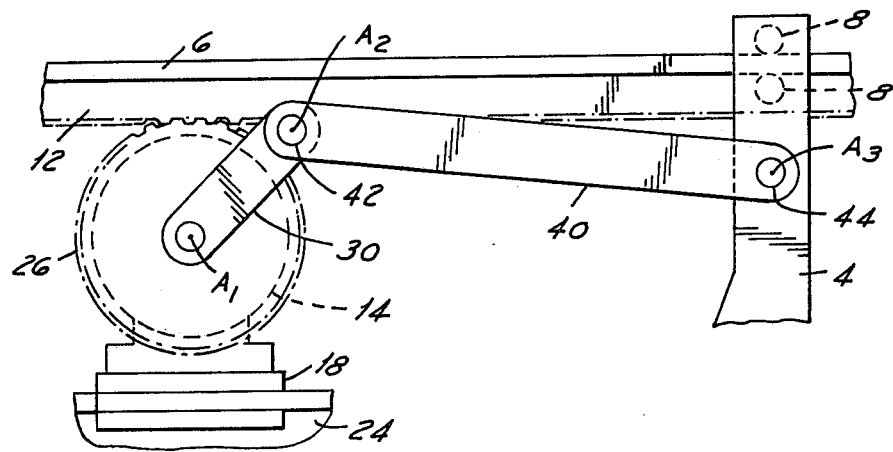

FIG. 12, a modification to the previously shown mechanism.

FIGS. 13 and 14, diagrammatic views of the mechanism of FIG. 12 showing the two 0 velocity positions.

FIG. 15, a side view of another embodiment of this invention.

FIG. 16, a sectional view taken on line 16—16 of FIG. 15.

FIG. 17, a sectional view taken on line 17—17 of FIG. 15.

FIG. 18, a sectional view taken on line 18—18 of FIG. 15.

FIGS. 19 and 20, side and top views, respectively, of a modification to the mechanism shown in FIG. 15.

FIG. 21, a side view of another embodiment of the invention.

FIG. 22, a sectional view taken on line 22—22 of FIG. 21.

FIG. 23, a side view of another embodiment of the invention for rotary output.

FIG. 24, a sectional view taken on line 24—24 of FIG. 25.

FIG. 25, a plan view of the mechanism shown in FIG. 23.

FIGS. 26 to 30, five sequential diagrammatic views of the mechanism of FIG. 25 at intervals during an index cycle.

FIG. 31, a sectional view of another embodiment of the invention for rotary output taken on line 31—31 of FIG. 32.

FIG. 32, a plan view of the embodiment of FIG. 31.

FIG. 33, a plan view of another embodiment of the invention for rotary output employing chains and sprockets.

FIG. 34, a side view of the mechanism of FIG. 33.

Figure 35:
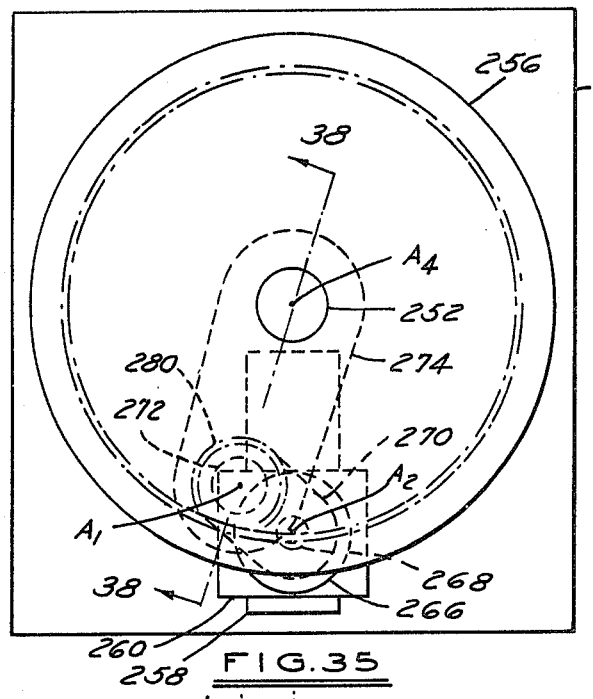

FIG. 35, a plan view of another embodiment of the invention for rotary output.

Figure 36:
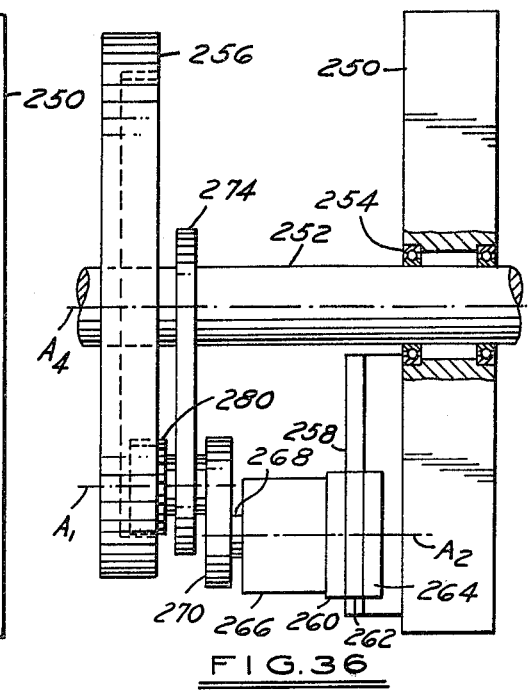
Figure 37:
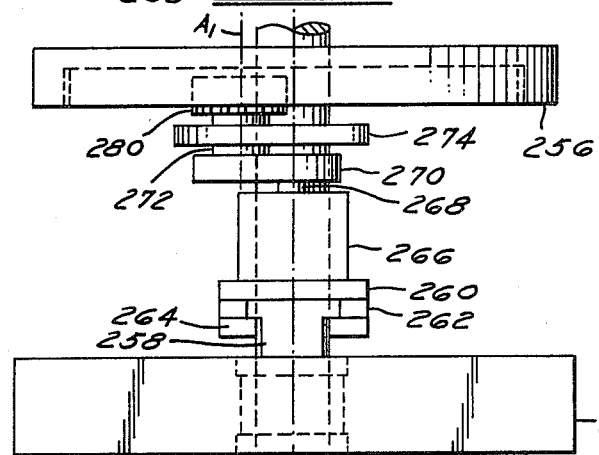

FIGS. 36 and 37, side views of the mechanism of FIG. 35.

Figure 38:
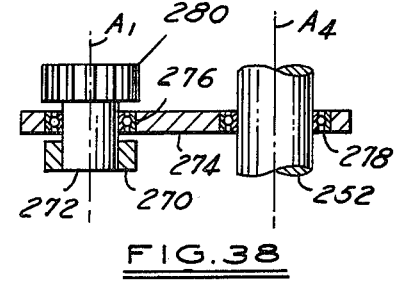

FIG. 38, a sectional view taken on line 38—38 of FIG. 35.

Figure 39:
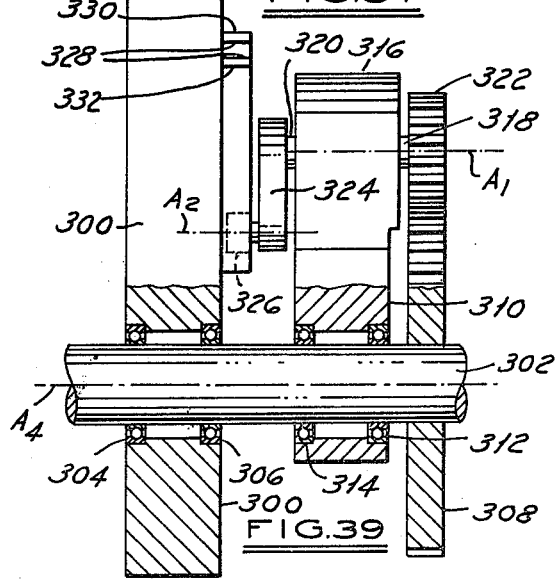
Figure 40:
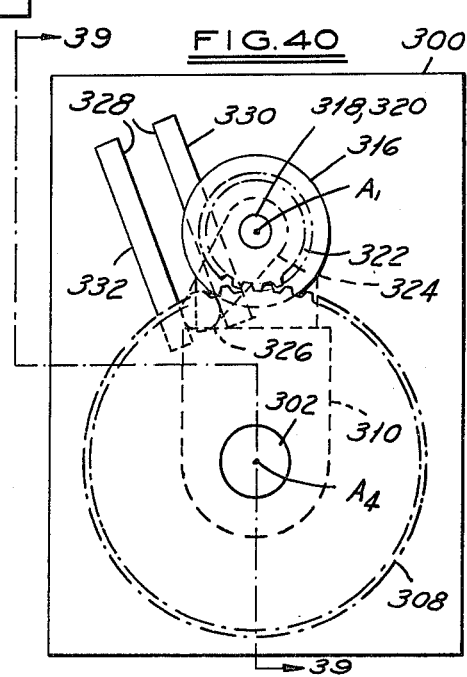

FIG. 39, a view taken on line 39—39 of FIG. 40 of another embodiment of the invention for rotary output.

FIG. 40, a plan view of the embodiment shown in FIG. 39.

FIG. 41, a view of another embodiment utilizing four-bar linkage support for the prime mover.

FIG. 42, an end view of the embodiment of FIG. 41.

FIG. 43, a sectional view on line 43—43 of FIG. 41.

FIG. 44, a view of another embodiment of the invention similar to that shown in FIGS. 23 to 25 but utilizing a four-bar linkage support.

FIG. 45, a top view of the mechanism of FIG. 44.

FIG. 46, a sectional view on line 46—46 of FIG. 44.

Figure 47:
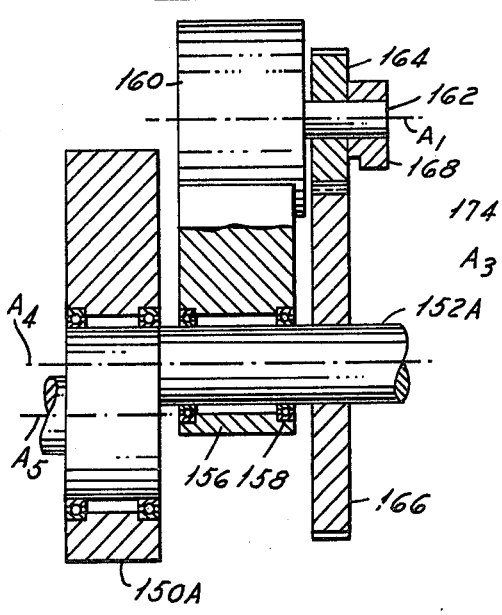
Figure 48:
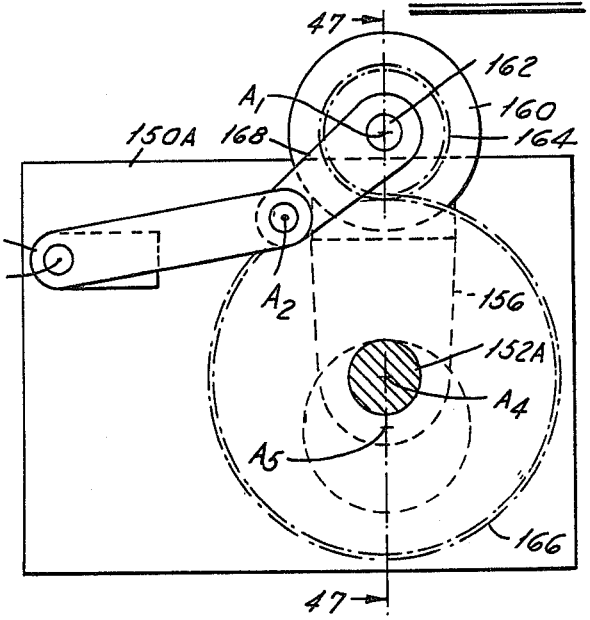

FIG. 47, a sectional view on line 47—47 of FIG. 48 showing another embodiment slightly modified but showing an eccentric shaft.

FIG. 48, a side view of the embodiment shown in FIG. 47.

Figure 49:
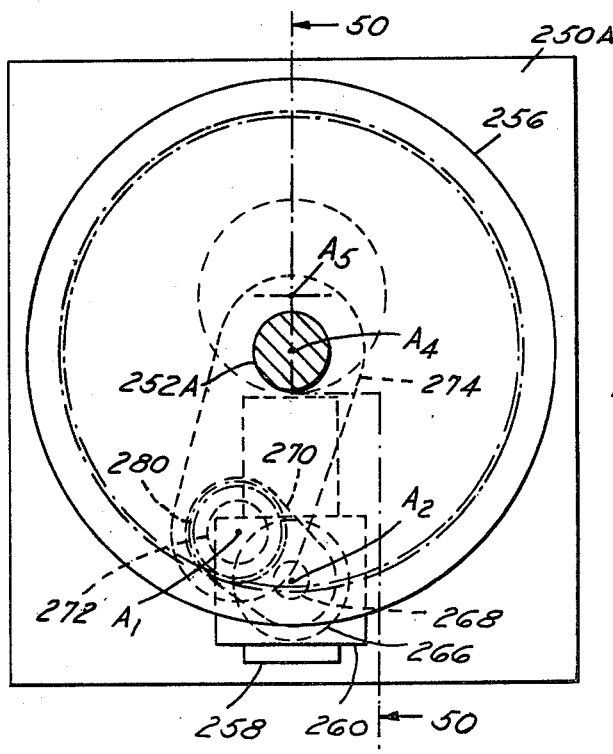

FIG. 49, a view similar to FIG. 35 illustrating an eccentric output shaft.

Figure 50:
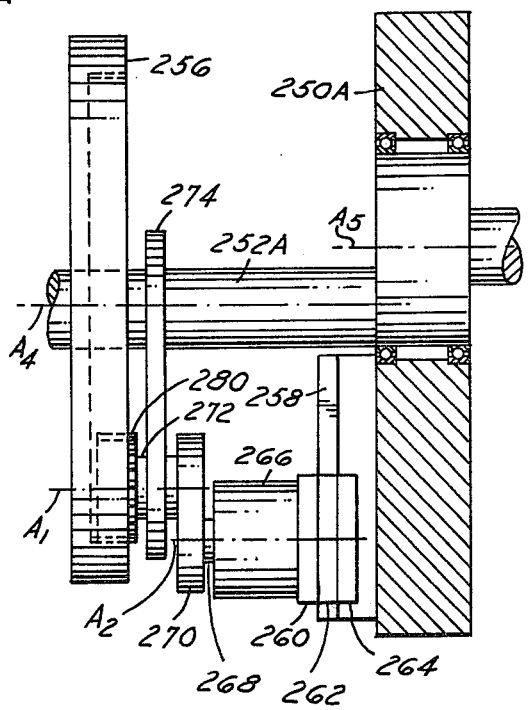

FIG. 50, an end view of the mechanism shown in FIG. 49.

BACKGROUND

In the field of mechanically generated reciprocating motions which reach 0 velocity at each end of a stroke, by far the most widely used system is the crank and connecting rod, or crank and scotch yoke. The resultant motion has been defined as "harmonic," and an output stroke is accomplished with a 180° angular movement of the input crank. The velocity and acceleration of classical harmonic motion is shown in FIG. 1. These curves are derived from the classical equations of harmonic motion which are:

Displacement $= \frac{1}{2} \times \text{stroke}(1 - \cos\theta)$

Velocity $\sim \frac{1}{2} \times \text{stroke} \times \sin\theta$

Acceleration $\sim \frac{1}{2} \times \text{stroke} \times \cos\theta$ where $\theta$ is the crank angle with a range of 0 to $\pi$ radians (0–180 degrees).

A second type of system which also has 0 velocity at each end of stroke employs "cycloidal" motion. Many cam actuated systems have their cam profiles developed using the equations of cycloidal motion. A family of mechanisms which naturally develop output characteristics which are substantially cycloidal are shown in my U.S. Pat. No. 3,789,676. Inherent in these mechanisms is the requirement that the index gear (or its equivalent) rotate through an angle of 360° in accomplishing an output index cycle. The velocity and acceleration of classical cycloidal motion (independent of the specific mechanism used for its generation) are shown in FIG. 2. These curves are derived from the classical equations of cycloidal motion which are:

Displacement = $(1/2\pi)$stroke$(\theta - \sin \theta)$

Velocity ~ $(1/2\pi)$stroke$(1 - \cos \theta)$

Acceleration ~ $(1/2\pi)$stroke $\times \sin \theta$ where $\theta$ is the drive gear angle and has a range of 0 to $2\pi$ radians (0–360 degrees).

For a variety of reasons, primarily mechanical and economic, it is desirable to have a mechanical system in which an output index cycle is generated with a generating input angle which lies between 180° and 360° while still reaching 0 velocity at each end of a stroke.

The family of mechamisms described below achieve this purpose.

There exists a group of commercially available prime movers which are air or hydraulically actuated which are capable of generating output index angles of approximately 270°. As a group, they are vane type rotary cylinders which by their inherent design cannot reach an angular output of 360°, but are limited to significantly smaller output angles; at the same time they are capable of reaching output angles far beyond 180°. Typical of such devices are the mechanisms shown in U.S. patents to Ludwig et al. U.S. Pat. No. 2,793,623, dated May 28, 1957 and Drake U.S. Pat. No. 3,215,046, dated Nov. 2, 1965.

With the mechanisms described below, these actuators having a nominally 270° output can be used to greater advantage both mechanically and kinematically than when they are used to actuate a 180° crank or harmonic systems.

LINEAR SYSTEMS

A typical mechanism providing a linear output and having an angular input movement of approximately 250° while still attaining 0 velocity at each end of the output stroke is shown in FIGS. 3, 4, 5 and 6. Referring to these figures, a base 2 supports a pair of brackets 4 which in turn guide an output bar 6 in rollers 8 and side guides 10 for movement along a linear path. A rack 12 is mounted to the output bar 6 with its pitch line parallel to the output path.

A prime mover 14 having a reciprocating angular output of approximately 250° is mounted through a riser 16 to a gib slide assembly made up of a slide plate 18, side guides 20, and keepers 22. These slide freely on a slide base 24 mounted on the base 2. The axis $A_1$ of the prime mover 14 is therefore free to move along a path parallel to the pitch line of the rack 12.

A drive gear 26 is mounted to the output shaft 28 (FIG. 5) of prime mover 14 concentric about axis $A_1$; this gear 26 is suitably formed to mesh with the rack 12. A control arm 30 is also mounted to the shaft 28 in non-rotational relationship with the gear 26. The outboard end of the arm 30 carries a roller 32 confined in a slot 34 formed in a guide bracket 36 mounted on the base 2. The axis of the roller $A_2$ remains equidistant from $A_1$ and is guided along the centerline of the slot 34. The centerline of the slot 34 is shown as perpendicular to the path of the output bar, but it may also be inclined at an angle; furthermore, while the slot is shown as being straight, it may also be curved, as will be subsequently explained.

It will be seen that as the arm 30 and gear are rotated in a clockwise direction from the starting position shown in FIG. 3 the output movement of the rack 12 is created by two components: a first component caused by the downward movement of the roller 32 in the slot 34 which causes the prime mover 14, gear 26, and axis $A_1$ to move initially to the left; and a second component caused by the clockwise rotation of the gear 26 about the moving axis $A_1$ which causes the rack 12 to move toward the right.

By defining the radius of the gear 26 as R, and the distance from axis $A_1$ to axis $A_2$ as $R_1$, the angle between $R_1$ and a line perpendicular to the rack pitch line as $\phi_{N1}$ and the angular velocity of the gear 26 as $\omega$, the kinematic schematic diagram of FIG. 7 was drawn. It may be seen that the velocity of the rack 12 (positive is to the right) is $V_R = R\omega - R_1\omega \cos \phi_{N1}$.

At the beginning of the stroke the velocity of the rack must be zero; therefore:

$$R - R_1 \cos \phi_{N1} = 0$$

$$\phi_{N1} = \arccos (R/R_1) \quad (1)$$

FIG. 8 presents the kinematic schematic diagram at the end of the stroke after the gear 26 has rotated clockwise through an angle greater than 180° but less than 360°. By an analogous process the 0 velocity point for the rack at the other end of the stroke is reached at an angle $$\phi_{N2} = \arccos (R/R_1) \quad (2)$$

Therefore $\phi_{N1} = \phi_{N2}$ and the total input angle is $2\pi - 2\phi_{N1}$ radians. The total stroke is seen to be $$\text{stroke} = R(2\pi - 2\phi_{N1}) + 2R_1 \sin \phi_{N1} \quad (3)$$

Equations (1) and (3) may be combined to yield $$\text{stroke} = 2R(\pi - \phi_{N1} + \tan \phi_{N1}) \quad (4)$$

For a given input angle, one may determine the value of $\phi_{N1} = \phi_{N2}$, then determine R from equation (4) and subsequently the value of $R_1$ from equation (1).

FIG. 9 is a diagrammatic view of the mechanism at some intermediate position between the two ends of the stroke. The total velocity of the rack is seen to be:

$$V = R\omega - R_1\omega \cos \phi \quad (5)$$

Since $\omega$ is equal to $(d\phi/dt)$ this may be rewritten:

$$V = R(d\phi/dt) - R_1(d\phi/dt) \cos \phi \quad (6)$$

This in turn may be differentiated with respect to t to obtain the acceleration A which yields, for $d\phi/dt$ as a constant:

$$A = R_1 (d\phi/dt)^2 \sin \phi \quad (7)$$

In order to compare the behavior of various systems, it is convenient to establish a standard input angle and a standard output stroke. Arbitrarily a standard input angle having a range of $2\pi$ is chosen to provide a constant input base. This is defined as the input clock angle, $\theta$, and moves through a range of $2\pi$ while the true geometric angle $\phi$ moves from $\phi_{N1}$ to $2\pi - \phi_{N1}$. Therefore:

$$\phi = \phi_{N1} + \left(\frac{2\pi - 2\phi_{N1}}{2\pi}\right)\theta \qquad (8)$$

Similarly, a constant output stroke is defined as $2\pi$ units as an arbitrary but constant output base for comparative purposes. Then from equation (4)

$$2\pi = 2R(\pi - \phi_{N1} + \tan \phi_{N1}) \qquad (9)$$

Whereupon:

$$R = \frac{\pi}{\pi - \phi_{N1} + \tan \phi_{N1}} \qquad (10)$$

It is desired to evaluate the characteristics of systems in which the value of $\phi_{N1}$ is taken to be 0, 30, 60 and 90 degrees. Using equations (10) and (1) it is possible to calculate the following table:

| $\phi N_1$ | | | |
|---|---|---|---|
| Deg. | Rad. | R | $R_1$ |
| 0 | 0 | 1 | 1 |
| 30 | $\pi/6$ | .98318 | 1.1352 |
| 60 | $\pi/3$ | .82102 | 1.6420 |
| 90 | $\pi/4$ | 0 | 3.1416 |

Using the values, it is possible to calculate the acceleration and velocity characteristics of various systems which are presented in FIGS. 10 and 11. Each system is calculated for the framework of having an output stroke of $2\pi$ units for an input clock angle of $2\pi$ radians, but for convenience the clock angle scale is presented in degrees. It will be understood that the acceleration characteristics of FIG. 10 are symmetrical about the point 0, 180°; while the velocity characteristics of FIG. 11 are symmetrical about the 180° line. The terms "Acceleration Factor" and "Velocity Factor" provide the relative scale for a $2\pi$ output for $2\pi$ input.

As expected, the characteristics for $\phi_N = 0°$ are those of cycloidal motion and the characteristics for $\phi_N = 90°$ are those of harmonic motion. Between these two extremes lie an infinity of systems illustrated by $\theta_N = 30°$ and $\theta_N = 60°$ whose characteristics are a compromise between cycloidal and harmonic. It is especially noteworthy to observe that when $\theta_N = 60$ the peak acceleration is less than either harmonic or cycloidal.

In summary, the mechanism described in connection with FIGS. 3–6 is capable of providing an index stroke having variable dynamic characteristics as a function of the true angular input angle $2\pi - 2\phi_N$ and for each $\phi_N$ there exists a specific ratio of R to $R_1$ where R is the pitch radius of the gear 26 and $R_1$ is the distance from the gear center axis $A_1$ to the roller 32 centerline axis $A_2$.

A variation on this linear system is shown in FIG. 12. The roller slot reaction system shown in FIGS. 3 and 6 is replaced by a reaction link. Referring to FIG. 12, the arm 30 is rotatably connected to a reaction link 40 by a pin 42; at its other end the link 40 is pivotably connected to the bracket 4 by a pin 44 on a stationary axis $A_3$. The remainder of the system is as shown in FIGS. 3, 4, 5 and 6. It will be seen that the general kinematic behavior of the embodiment of FIG. 12 is comparable to that of the embodiment of FIGS. 3–6 except that a slight variation is introduced due to the oscillation of link 40 during an index. Furthermore, the end position geometry is modified as can be seen in FIGS. 13 and 14.

Referring to FIG. 13, which is a kinematic schematic of the embodiment of FIG. 12 at one end position at which the velocity of the rack 12 is specified as being 0, the rack 12 to gear 26 pitch line tangency point is defined as $P_0$. The arm 30 and gear 26 rotate in unison about moving axis $A_1$ and may be considered a single free body. At any instant a virtual link exists between point $P_0$ and axis $A_2$. Therefore, if point $P_0$, axis $A_2$ and axis $A_3$ are colinear, there will exist zero relative velocity between point $P_0$ and axis $A_3$ independent of the angular velocity of the link 40 and the angular velocity of the virtual link $P_0A_2$. The zero velocity position of the rack occurs when the axis $A_2A_3$ and the tangency point $P_0$ between the rack 12 and gear 26 are colinear.

Similarly, the 0 velocity position of the rack 12 occurs at the other end of the stroke, as shown in FIG. 14, when this same colinear condition exists; except that in this situation the tangency point $P_0$ lies between the axes $A_2$ and $A_3$.

The exact end point angles and the kinematic behavior during a stroke may be determined using normal kinematic techniques, comparable to those outlined in connection with FIG. 9.

The link 40 may be considered as a curved slot having a center of curvature on axis $A_3$.

Another embodiment of the linear output systems is shown in FIGS. 15, 16, 17 and 18. In this instance, the prime mover is mounted on the pivoted link thereby eliminating the prime mover support slide. Referring to FIGS. 15, 16, 17 and 18, a base 50 supports two risers 52 which in turn support and guide an output bar 54 for movement in a linear path through rollers 56 and side guides 58 (FIG. 17). An auxiliary guide bar 60 and rack 62 are fastened to the output bar 54 through a spacer 64 with the pitch line of the rack parallel to the bar 60.

A prime mover 66 is mounted on a bracket 68 which in turn is pivotally supported from a clevis bracket 70 through a shaft 72 and bearings 74 on an axis $A_3$. The prime mover 66 is of the type capable of providing a rotary output of approximately 270° of its output shaft 76. A drive arm 78 is connected to the shaft 76 to be driven about the moving axis $A_2$. This drive arm 78 in turn supports a gear 80 concentric about an axis $A_1$, with the gear 80 being formed to mesh with the rack 62. The gear 80 and rack 62 are held in pitch line contact by a guide assembly made up of rollers 82 guided on bar 60, and mounted in a plate 84 which also supports a shaft 86 on axis $A_1$ mounted in bearings 88 and housing 90 which is fastened to the gear 80.

It can be seen that as the shaft 76 rotates clockwise about axis $A_2$, that axis $A_2$ oscillates about axis $A_3$ while the gear 80 also rotates clockwise about axis $A_1$ which oscillates along a line parallel to the pitch line of the rack 62. The end points of the stroke, i.e., the 0 velocity points of the rack 62, are determined precisely in the same way as was indicated in connection with the embodiment of FIG. 12. The kinematic characteristics during an index stroke are different for the embodiment of FIGS. 15-18 as compared to FIG. 12 since in the former case, the input angle is relative to the oscillating support arm 68, while in the latter case, the input angle is relative to the slide assembly which has no angular oscillatory motion.

A fourth embodiment for linear output systems is shown in FIGS. 19 and 20. This is kinematically identical with the embodiment of FIGS. 3-6, including the end angle determination, the difference lying only in the mechanical arrangement.

Referring to FIGS. 19 and 20, a base 50, as in FIGS. 15, 16 and 17, supports an output bar assembly made up of output bar 54, auxiliary guide bar 60, rack 62 and spacer 64 with riser brackets, rollers and side guides not shown but identical with those of FIGS. 15, 16 and 17.

The prime mover 66 is supported from the base 50 on a vertical slide assembly which consists of a slide bracket 100 on which is slidably mounted a slide assembly consisting of plate 102, gibs 104, keepers 106, and spacer 108.

As in FIGS. 15-17, the drive arm 78 supports a gear 80 concentric on axis $A_1$ which is held in pitch line contact with the rack 62 with a guide assembly.

In the embodiment of FIGS. 19 and 20, the torque is supplied on axis $A_2$ while in the embodiment of FIGS. 3-6 the torque is supplied on axis $A_1$; the same kinematic diagrams apply to both, and the movement of axes $A_1$ and $A_2$ is identical.

Here again, the slide axis need not be perpendicular to the pitch line of the rack 62; a reasonable amount of kinematic flexibility may be gained by a moderate tilting of the slide bracket 100.

A fifth linear output embodiment is shown in FIGS. 21 and 22. A base 120 supports a riser 122 on which is mounted a prime mover 124; this prime mover 124 is again of the type which provides a rotary output of approximately 270° of its output shaft 126. A drive arm 128 is supported on the shaft 126 on axis $A_2$; at its outboard end the arm 128 supports a gear 130 concentric about an axis $A_1$. A pivoted bar gear rack 132 is suitably formed to mesh with the gear 130 and be driven by it. At one end the rack 132 is pivot connected to a link 134 by a pin 136. The link 134 is pivot connected to the base 120 by a pin 138; at its other end the link 134 is pivoted connected to an output bar 140 through pin 142.

The rack 132 and gear 130 are maintained in pitch line contact by a guide assembly comprising rollers 144 rotating on shafts 146 mounted on plate 148 which in turn also mounts a shaft 150 rotating in bearings 152 housed in the gear 130 on axis $A_1$.

Referring to FIG. 21, it can be seen that as output shaft 126 of the prime mover 124 rotates counterclockwise from the position shown, the rack 132 pivoting about pin 136 moves upward and accelerates to the left causing the arm 134 also to accelerate to the left. The zero velocity point of the link 134, independent of the angular velocity of the arm 128, occurs when the pitch line of the rack intersects the prime mover axis $A_2$. Similarly, after the prime mover has completed approximately 270° counterclockwise rotation, the pitch line of the rack will again intersect the axis $A_2$ which is the zero velocity point of the rack at the other end of the stroke.

The kinematic characteristics of this embodiment are similar but not identical to those characteristics of the embodiment of FIGS. 3-6 due to the angular movement of the rack 132. As the distance from pin 136 to the point of tangency between rack 132 and gear 130 is made longer, the difference in kinematic characteristics becomes smaller, and as the distance approaches infinity, the difference approaches 0.

ROTARY SYSTEMS

The same principles of converting a rotary input movement greater than 180° but less than 360° into a linear output stroke having 0 velocity at each end of the linear stroke may also be applied to rotary output systems. A first embodiment of such a rotary output system is shown in FIGS. 23, 24 and 25. Referring to these figures, a frame 150 supports an output shaft 152 through bearings 154 on axis $A_4$. A support arm 156 (FIG. 24) is pivoted on the shaft 152 through bearings 158; the arm 156 in turn supports a prime mover 160, which is again of the type which provides a rotary angular output of approximately 270° of its output shaft 162 on axis $A_1$.

The shaft 162 drives a gear 164 mounted thereon which is formed to mesh with a gear 166 mounted on the output shaft 152. The shaft 162 also mounts an arm 168 which rotates with the gear 164; the outboard end of the arm 168 is rotatably connected by a pin 170 on axis $A_2$ to a link 172; at its other end the link 172 is pivoted connected by a pin 174 on axis $A_3$ to a bracket 176 mounted to the frame 150.

The mechanism as oriented in FIG. 25 shows the component position when the output gear 166 is at one end of its stroke, at which time the gear 166 is at zero velocity independent of the angular velocity of the shaft 162 about axis $A_1$. This occurs when the extension of the centerline from axis $A_3$ through axis $A_2$ intersects the point of tangency between gear 164 and gear 166.

The qualitative behavior of the mechanism during an index cycle is shown in the series of schematic drawings of FIGS. 26, 27, 28, 29 and 30. In FIG. 26, the mechanism is again shown at one end of the angular output stroke of gear 166, at which time the angular velocity of the gear 166 is zero since the $A_2A_3$ centerline intersects the gear point of tangency.

In FIG. 27, the mechanism is shown after the gear 169 has rotated approximately 70° in a clockwise direction about axis $A_1$. The gear 166 has rotated slightly in a counterclockwise direction and is moving at an increasing angular velocity about the fixed axis $A_4$.

In FIG. 28, the mechanism is shown after the gear 164 has rotated approximately 140° in a clockwise direction about axis $A_1$. The gear 166 has rotated through approximately one half its total output angle and is moving at its approximate maximum angular velocity in a counterclockwise direction about the fixed axis $A_4$.

In FIG. 29, the mechanism is shown after the gear 164 has rotated approximately 200° in a clockwise direction about axis $A_1$. The gear 166 has traversed most of its counterclockwise stroke about the fixed axis $A_4$ and is moving at a decreasing angular velocity.

In FIG. 30, the mechanism is shown after the gear 164 has rotated approximately 270° in a clockwise direction about axis $A_1$ reaching nearly the end of its angular stroke. The gear 166 has completed its counterclockwise stroke about the fixed axis $A_4$ and is again at zero velocity since the centerline from axis $A_2$ to axis $A_3$ again intersects the point of tangency between gears 164 and 166. It will be noted that the total index angle of gear 166 from one zero velocity point to the second zero velocity point is the sum of a first angle obtained by dividing the rotation angle of gear 164 by the gear ratio of gear 166 to gear 164 and a second angle which is the angular shift in the tangency point between gear 164 and gear 166, i.e., the angular advance of the centerline $A_1A_4$ as may be observed from FIGS. 26 and 30.

A second embodiment providing a rotary angular output is shown in FIGS. 31 and 32. This is different from the embodiment of FIGS. 23-25 in that this second embodiment employs internal rather than external gears, the prime mover supplies torque on a different axis and the drive gear to output gear pitch line contact is maintained by a circular slot in the output gear rather than by a link to the output shaft.

Referring to FIGS. 31 and 32, a frame 180 supports an output shaft 182 rotating in bearings 184, on axis $A_4$. The shaft 182 supports and is driven by an internal gear 186. The frame 180 also supports a stationary shaft 188 which in turn pivotably supports a bracket 190 through bearings 192 on a fixed axis $A_3$. The bracket 190 supports a prime mover 194 which is again of the type which provides a rotary angular output of approximately 270° of its output shaft 196 on axis $A_2$. The shaft 196 supports and drives an arm 198 which in turn supports a drive gear 200 concentric about an axis $A_1$; the gear 200 is suitably formed to mesh with the internal gear 186. A roller 202 is concentrically mounted to the gear 200 on axis $A_1$; the roller 202 is engaged in a close fitting slot 204 in the gear 186, with the centerline of the slot 204 being equidistant from the pitch line of the gear 186. It should be noted that the gear 186 and the slot 204 need not be concentric with the output axis $A_4$; indeed variations in kinematic characteristics may be accomplished by a controlled eccentricity between gear 186 and the output shaft 182 on axis $A_4$.

The end points of the mechanism movement are again the zero velocity points of the gear 186 at which time the $A_2A_3$ centerline intersects the tangency point between gears 200 and 186. One such end of stroke condition is shown by FIG. 32.

A third embodiment for rotary angular output is shown in FIGS. 33 and 34. This differs from the embodiment of FIGS. 23, 24 and 25 in that a chain and sprocket system is employed in lieu of gears and that a prime mover having a double ended output shaft is employed.

Referring to FIGS. 33 and 34, a frame 210 supports an output shaft 212 which rotates about axis $A_4$ in bearings 214. A sprocket 216 is mounted on the shaft 212 and rotates concentrically with it. An arm 218 is supported by the shaft 212 through bearings 220 and in turn supports a prime mover 222 of the type which generates a rotary angular output of approximately 270°. In this case the prime mover 222 has an output shaft 224 on one side and an output shaft 226 on the other side, both of which rotate in unison on axis $A_1$. A sprocket 228 is mounted on shaft 224; sprocket 228 drives sprocket 216 through a chain 230 suitably formed to mesh with both sprockets. An arm 232 is mounted to shaft 226 at its one end; at its other end the arm 232 is rotatably connected to a link 234 by a pin 236 on axis $A_2$. The other end of the link 234 is pivotably connected to the frame 210 by a pin 238 on axis $A_3$.

The orientation of the mechanism in FIG. 33 is at one end of the angular output stroke of sprocket 216 and shaft 212. It can be shown that a sprocket pair connected by a chain is the kinematic equivalent of an internal gear and an external gear on the same center distance and having the same ratio as the aforesaid sprocket pair. In this embodiment as illustrated by FIG. 33 the zero velocity positions of the output shaft 212 occur when the $A_2A_3$ centerline intersects the theoretical tangency point of the equivalent internal gear and external gear.

A fourth rotary output embodiment is shown in FIGS. 35, 36, 37 and 38. In this instance, an internal gear system is again illustrated but the prime mover is mounted on a slide from the frame while the driving gear is maintained to pitch line contact with the internal gear by a floating link from the output shaft.

Referring to FIGS. 35, 36, 37 and 38, frame 250 supports an output shaft 252 rotating on an axis $A_4$ through bearings 254. The shaft 252 in turn supports and is driven by an internal gear 256. A slide base 258 is mounted to the frame 250 and in turn slidably mounts a slide assembly made up of slide plate 260, gibs 262, and keepers 264 (FIG. 37). The plate 260 supports a prime mover 266 of the type capable of generating a rotary output of approximately 270° of its output shaft 268 which rotates on an axis $A_2$. The shaft 268 supports an arm 270 which in turn supports a shaft 272 which is concentric about an axis $A_1$. A link 274 maintains a constant distance between axis $A_1$ and axis $A_4$; at one end link 274 is connected to shaft 272 through bearing 276 (FIG. 38) and at its other end link 274 is connected to shaft 252 through bearing 278. A drive gear 280 is concentrically mounted on shaft 272 and is suitably formed to mesh with the internal gear 256.

The zero velocity positions of the gear 256 occur when a line perpendicular to the slide 258-264 line of action and passing through the axis $A_2$ intersects the point of tangency between gears 256 and 280. The kinematic behavior of the mechanism is similar to the other embodiments. The use of a slide is in effect the same as using a link, such as link 192 in FIG. 3, that is infinitely long.

The centerline passing through the axis $A_2$ and parallel to the line of action of the slide assembly 258-264 is shown as passing through the output axis $A_4$. This need not be the case; indeed a controlled degree of kinematic flexiblity may be achieved by skewing the slide line of action over a nominal angular range.

A fifth rotary output embodiment is shown in FIGS. 39 and 40. In this instance the link 172 of FIG. 25 is replaced by a roller and slide combination, and a prime mover having a double ended output shaft is utilized. Referring to FIGS. 39 and 40, a frame 300 supports an output shaft 302 in bearings 304 and 306 for rotation about an axis $A_4$. The shaft 302 supports and is driven by an external gear 308, concentric about axis $A_4$. A pivoted link 310 is supported from shaft 302 through bearings 312 and 314 on axis $A_4$. The link 310 in turn supports a rotary prime mover 316 which again is of the type capable of generating an angular output movement of approximately 270°; in this embodiment this output movement occurs for both of two colinear output shafts 318 and 320 which extend from each side of the prime mover 316; shaft 318 and shaft 320 rotate in unison on an axis $A_1$. A drive gear 322 is mounted on and driven by the shaft 318; the gear 322 is formed to mesh with and drive the gear 308.

The shaft 320 supports and drives an arm 324, which in turn supports a roller 326 mounted on the axis $A_2$ displaced from and parallel to axis $A_1$. The roller 326 is closely but movably confined in a slot 328 formed by two bar rails 330 and 332 which are fastened to the frame 300.

The zero velocity points occur when a line perpendicular to the axis of the slot 328 and through the axis $A_2$ intersects the tangency point between gears 322 and 308.

In FIG. 40, the axis of the slot 328 is shown as passing through the axis $A_4$; this need not be the case. Over a reasonable range of values, the axis of the slot 328 may be displaced to change the kinematic characteristics of the system.

Another rotary embodiment is illustrated in FIGS. 41, 42 and 43. This embodiment is most similar to the mechanism shown in FIGS. 35–38, the difference arising out of the means through which the prime mover is supported and guided along a path substantially transverse to the drive surface of the output gear. Whereas in FIGS. 35–38 this is accomplished by a gib slide, in the embodiment of FIGS. 41, 42 and 43, this is accomplished by a four-bar linkage.

Referring to FIGS. 41, 42 and 43, a frame 350 supports an output shaft 352 through bearings 354 and 356 for rotation on the axis $A_4$. An internal gear 358 is concentrically mounted on and drives the shaft 352.

A bracket 360 is also mounted to the frame 350 and in turn pivotally supports two links 362 and 364 through shafts 366 and 368. A movable link 370 is in turn pivotally supported from the outboard ends of the links 362 and 364 by shafts 372 and 374. The bracket 360, links 362, 364 and 370 therefore constitute a pivot connected four-bar linkage which permits the link 370 to move along a path substantially transverse to the pitch line of the gear 358.

The link 370 in turn supports a prime mover 376 of the type capable of generating less than 360° but more than 180° of output angular movement. An eccentric plate 378 is mounted to the output shaft 380 of the prime mover 376 rotating about the axis $A_2$; the plate 378 in turn supports an eccentric shaft 382 rotating about an axis $A_1$ displaced from axis $A_2$. A drive gear 384 suitably formed to mesh with the gear 358 is mounted on the shaft 382 and also rotates on axis $A_1$. The shaft 382 is maintained at a constant radial distance from the shaft 352 by a link 386 which is rotatably mounted at one end to the shaft 352 and rotatably connected at its other end to the shaft 382.

The operation of this embodiment is substantially similar to that of the other embodiments except that the axis $A_2$ is restrained to a path substantially transverse to the pitch line of the gear 358 by a four-bar linkage, rather than a slot, slide, or simple link as in the other embodiments.

For every position of the four-bar linkage 360, 362, 364, 370, there exists an instantaneous center of rotation of the link 370. The zero velocity points for the output gear 358 occur when a straight line through the instantaneous center of rotation of the link 370 and passing through the axis $A_2$ also intersects the point of tangency between gears 384 and 358.

Another embodiment employing a four-bar linkage in lieu of a simple link or slot is illustrated in FIGS. 44, 45 and 46. In this embodiment, the four-bar linkage is utilized to guide the axis $A_1$ along a path equidistant to the axis $A_4$ rather than by a simple link. Aside from this difference, this embodiment is substantially identical to the embodiment of FIGS. 23, 24 and 25.

Referring to FIGS. 44, 45 and 46, a frame 400 supports an output shaft 402 through bearings 404 and 406 on which the shaft 402 rotates about the axis $A_4$. An output gear 408 is concentrically mounted on and drives the shaft 402. A link 410 is rotatably mounted on the shaft 402 through bearings 412 and 414; at its other end the link 410 rotatably supports the prime mover 416 having an output shaft 418 through bearings 420 and 422. The prime mover 416 is again of the type that generates an angular output movement greater than 180° but less than 360°.

A link extension 424 is connected to the case of the prime mover 416; this link 424 in turn is pivotally connected to a link 426 through a shaft 428. The other end of the link 426 is pivotally connected to the frame 400 through a shaft 430 and riser 432. Therefore, it can be seen that the base 400 links 410, 424 and 426 constitute a four-bar linkage which supports the prime mover 416 and maintains a constant distance from the axis $A_1$ to the axis $A_4$.

A drive gear 434, suitably formed to mesh with the gear 408, is mounted on the output shaft 418 of the prime mover 416. An arm 436 is also mounted to the shaft 418; at its other end the arm 436 is pivot connected to a link 438 through a shaft 440, on axis $A_2$. The link 438, at its other end, is pivot connected to the frame 400 through shaft 442 on axis $A_3$ and riser 444.

The zero velocity points of this embodiment and the general operating sequence are similar to those described in connection with the embodiment shown in FIGS. 23, 24 and 25. The kinematic behavior is altered since the prime mover has a variable angular position relative to the link 410 rather than being mounted directly thereon as in FIG. 25. This angular position variation is controlled by the design of the links 424 and 426 and permits a large degree of kinematic characteristic control.

The utilization of four-bar linkages in lieu of slides or simple links is equally applicable to the linear embodiments, whether the prime mover is mounted on the $A_1$ axis or the $A_2$ axis. It will be further understood that the application of four linkages is applicable to all rotary systems.

The utilization of a four-bar linkage as illustrated in the embodiments of FIGS. 41–43 and FIGS. 44–46 is a matter of mechanical convenience and kinematic flexibility.

Still greater kinematic flexibility can be achieved in all of the rotary embodiments by selectively displacing the output axis from the axis of the output gear i.e., the output gear is mounted eccentrically on the output shaft. When this is done, the radial link that maintains the pitch line contact between the output gear and the drive gear must be pivotally connected about the center of the output gear rather than the output axis. This modification is illustrated by FIGS. 47–50.

This modification is shown in FIGS. 47 and 48 and applies to the embodiment of FIGS. 23, 24 and 25. It will be noted that the construction is the same except that the output shaft 152A now is an eccentric shaft and rotates with respect to the frame 150A on an axis $A_5$. The gear 166 is mounted concentrically about the axis $A_4$ and the link 156 is rotatably journalled on axis $A_4$. Axes $A_4$ and $A_5$ are displaced from each other and therefore axis $A_4$ is eccentric to the axis $A_5$ which is fixed with respect to the frame 150A and is the true output axis.

The modification shown in FIGS. 49 and 50 illustrates the same principle but in this instance applies to the embodiment of FIGS. 35–38. The output shaft 252A is again an eccentric shaft rotating with respect to frame 250A about the fixed output axis $A_5$. The gear 256 is mounted to the shaft 250A concentric about the displaced eccentric axis $A_4$; similarly, the link 274 is rotatably journalled about the axis $A_4$ with axis $A_4$ displaced from axis $A_5$.

Reversal of the output stroke for all embodiments is accomplished by reversal of the prime mover. Indeed, these mechanisms are useful only for reversing applications since the input prime movers are themselves capable only of reversing movement as opposed to continuous rotation. Because of this inherent characteristic, the output gear, whether it be internal or external, need by only as long as required by the output angle to which a given mechanism is designed. Stated another way, the output gears need be only sector gears rather than complete circular gears. This is of particular advantage where output angles of 180° or less are required.

ROTARY SUMMARY

A review of the various rotary output embodiments indicates that the mechanical combinations may be catalogued into groupings of alternate mechanical constructions. The driving connection may employ chains and sprockets or two gears in mesh, with the output gear of the internal or external type. The prime mover may supply torque on the $A_1$ axis which oscillates along a path equidistant from the drive surface of the output gear or sprocket; or the prime mover may supply torque on the $A_2$ axis which moves along a path substantially transverse to the drive surface of the output gear or sprocket. The $A_1$ axis may be guided along its path equidistant from the drive surface of the output gear or sprocket by a link between the $A_1$ axis and the $A_4$ axis, which is the center of the output gear or sprocket, by a four-bar linkage, or by a circumferential slot in that output gear or sprocket. The $A_2$ axis may be guided along its path substantially transverse to the drive surface of the output gear or sprocket by a simple link between the $A_2$ axis and a fixed axis $A_3$ of the frame, or by a four-bar linkage or by a slot or slide on the frame. Furthermore, the center of the output gear or sprocket, axis $A_4$, may be concentric with or eccentric to the axis of the output shaft which, if different from $A_4$, is categorized as $A_5$. It is clear that the total number of combinations arising from these alternatives is very large. Each specific alternative is shown in one or more embodiments, but not all possible combinations are shown. It will be understood that any combination, including those not shown, fall within the intent of this invention and that all such combinations may be visualized and designed from the limited and illustrative embodiments described herein.

I claim:

1. A reversible indexing system having a rotary angular input movement of greater than 180° and less than 360° and an output movement reaching zero velocity at each end of its stroke independent of input velocity comprising:
   (a) a frame,
   (b) an output member mounted in said frame for movement in a predetermined path,
   (c) a first rotating drive member having a driving relationship with said output member and rotating about a first axis,
   (d) first means positioning said output member and said first rotating drive member for a driving relationship and guiding said first rotating member along a path equidistant from said output member,
   (e) a second drive member eccentrically and rigidly mounted to said first rotating drive member and moving in a path substantially transverse to the path of said first axis,
   (f) second means connecting said second drive member and said frame and guiding said second drive member along a path substantially relatively transverse to the drive surface of said output member, and
   (g) a reversible rotary prime mover having an output shaft with an angular output movement greater than 180° and less than 360°, said shaft being connected to and driving one of said drive members.

2. A reversible indexing system having a rotary angular input movement of greater than 180° and less than 360° and an output movement reaching zero velocity at each end of the stroke independent of input velocity comprising:
   (a) a frame,
   (b) an output member mounted in said frame for movement along a substantially linear path,
   (c) a first rotating drive member having a driving relationship with said output member and rotating about a first axis,
   (d) means positioning said output member and said first rotating drive member for a driving relationship and guiding said first rotating member along a path relatively parallel to the drive surface of said output member,
   (e) a second drive member eccentrically and rigidly mounted to said first rotating drive member and moving in a path substantially transverse to the path of said first axis,
   (f) means connecting said second drive member and said frame and guiding said second drive member along a path substantially relatively transverse to the drive surface of said output member, and
   (g) a reversible rotary prime mover having an output shaft with an angular output movement greater than 180° and less than 360°, said output shaft being connected to and driving one of said drive members.

3. A reversible indexing system having a rotary angular input movement of greater than 180° and less than 360° and a rotary output movement reaching zero velocity at each end of its stroke independent of input velocity comprising:
   (a) a frame,
   (b) an output member mounted in said frame for rotation about an output axis,
   (c) a first rotating drive member having a driving relationship with said output member and rotating about a first axis,
   (d) means positioning said output member and said first rotating drive member for a driving relationship and guiding said first rotating drive member along an arcuate path equidistant from the center of said output member,
   (e) a second drive member eccentrically and rigidly mounted to said first rotating drive member and moving in a path substantially transverse to the path of said first axis,
   (f) means connecting said second drive member and said frame and guiding said second drive member along a path substantially transverse to the path of said first rotating drive member, and
   (g) a reversible rotary prime mover having an output shaft with an angular output movement greater than 180° and less than 360°, said shaft being connected to and driving one of said drive members.

4. A reversible indexing system having a rotary angular input movement of greater than 180° and less than 360° and an output movement reaching zero velocity at each end of its stroke independent of input velocity, comprising:
   (a) a frame,
   (b) an output member comprising a first section of toothed gearing and mounted in said frame for movement in a predetermined path,
   (c) a first rotating drive member comprising a circular section of toothed gearing concentric with and rotating about a first axis and in engagement with said first section of toothed gearing,
   (d) first means positioning said output member and said first rotating drive member for engaging of said sections of toothed gearing and guiding said first axis along a path equidistant from the pitch line of said first section of toothed gearing,
   (e) a second drive member eccentrically and rigidly mounted to said first rotating drive member and moving in a path substantially transverse to the path of said first axis,
   (f) second means connecting said second drive member and said frame and guiding said second drive member along a path substantially relatively transverse to the pitch line of said first section of toothed gearing, and
   (g) a reversible rotary prime mover having an output shaft with an angular output movement greater than 180° and less than 360°, said shaft being connected to and driving one of said drive members.

5. A reversible indexing system having a rotary angular input movement of greater than 180° and less than 360° and an output movement reaching zero velocity at each end of its stroke independent of input velocity, comprising:
   (a) a frame,
   (b) an output member mounted in said frame for movement in a predetermined path,
   (c) a first rotating drive member adapted for tangential driving and rotating about a first axis,
   (d) flexible drive means in driven engagement with said first rotating drive member and driving said output member,
   (e) first means positioning said output member and said first rotating drive member for driving by said flexible drive means and guiding said first rotating drive member along a path equidistant from said output member,
   (f) a second drive member eccentrically and rigidly mounted to said first rotating drive member and moving in a path substantially transverse to the path of said first axis,
   (g) second means connecting said second drive member and said frame and guiding said second drive member along a path substantially relatively transverse to the path of said first axis, and
   (h) a reversible rotary prime mover having an output shaft with an angular output movement greater than 180° and less than 360°, said shaft being connected to and driving one of said drive members.

6. A reversible indexing system having a rotary angular input movement of greater than 180° and less than 360° and an output movement reaching zero velocity at each end of its stroke independent of input velocity comprising:
   (a) a frame,
   (b) an output member mounted in said frame for movement in a predetermined path,
   (c) a first rotating drive member having a driving relationship with said output member and rotating about a first axis,
   (d) first means positioning said output member and said first rotating drive member for a driving relationship and guiding said first rotating member along a path equidistant from said output member,
   (e) a second drive member eccentrically and rigidly mounted to said first rotating drive member and moving in a path substantially transverse to the path of said first axis,
   (f) second means connecting said second drive member and said frame and guiding said second drive member along a path substantially relatively transverse to the drive surface of said output member, and
   (g) a reversible rotary prime mover having an output shaft with an angular output movement greater than 180° and less than 360° mounted on said first means and driving said first rotating drive member about said first axis.

7. A reversible indexing system having a rotary angular input movement of greater than 180° and less than 360° and an output movement reaching zero velocity at each end of its stroke independent of input velocity comprising:
   (a) a frame,
   (b) an output member mounted in said frame for movement in a predetermined path,
   (c) a first rotating drive member having a driving relationship with said output member and rotating about a first axis,
   (d) first means positioning said output member and said first rotating drive member for a driving relationship and guiding said first rotating member along a path equidistant from said output member,
   (e) a second drive member eccentrically and rigidly mounted to said first rotating drive member and moving in a path substantially transverse to the path of said first axis,
   (f) second means connecting said second drive member and said frame and guiding said second drive member along a path substantially relatively transverse to the drive surface of said output member, and
   (g) a reversible rotary prime mover having an output shaft with an angular output movement greater than 180° and less than 360° mounted on said second means and driving said second drive member.

8. A reversible indexing system having a rotary angular input movement of greater than 180° and less than 360° and an output movement reaching zero velocity at each end of the stroke independent of input velocity comprising:
   (a) a frame,
   (b) a first output member movably mounted to said frame,
   (c) a gear rack member pivotally mounted to said first output member,
   (d) a reversible rotary prime mover mounted on said frame and having an output shaft with an angular output movement about a second axis greater than 180° and less than 360°,
   (e) a drive gear member concentric about a first axis and eccentrically mounted to said shaft of said rotary prime mover with said first axis displaced from said second axis and in driving engagement with said gear rack member, and (f) means positioning said gear rack member and said drive gear member for driving engagement and guiding said gear rack member pitch line in a path equidistant from said first axis of said drive gear member.

9. A reversible indexing system having a rotary angular input movement of greater than 180° and less than 360° and an output movement reaching zero velocity at each end of the stroke independent of input velocity comprising:

(a) a frame, (b) an output member mounted in said frame for movement along a substantially linear path, (c) a first rotating drive member having a driving relationship with said output member and rotating about a first axis, (d) means positioning said output member and said first rotating drive member for a driving relationship and guiding said first rotating member along a path relatively parallel to the drive surface of said output member, (e) a second drive member eccentrically and rigidly mounted to said first rotating drive member and moving in a path substantially transverse to the path of said first axis, (f) link means pivotally connected to said frame and guiding said second drive member along a path substantially relatively transverse to the drive surface of said output member, and (g) a reversible rotary prime mover having an output shaft with an angular output movement greater than 180° and less than 360°, said output shaft being connected to and driving one of said drive members.

10. A reversible indexing system having a rotary angular input movement of greater than 180° and less than 360° and an otuput movement reaching zero velocity at each end of the stroke independent of input velocity comprising:

(a) a frame, (b) an output member mounted in said frame for movement along a substantially linear path, (c) a first rotating drive member having a driving relationship with said output member and rotating about a first axis, (d) means positioning said output member and said first rotating drive member for a driving relationship and guiding said first rotating member along a path relatively parallel to the drive surface of said output member, (e) a second drive member eccentrically and rigidly mounted to said first rotating drive member and moving in a path substantially transverse to the path of said first axis, (f) slide means mounted to said frame and guiding said second drive member along a path substantially transverse to the drive surface of said output member, and (g) a reversible rotary prime mover having an output shaft with an angular output movement greater than 180° and less than 360°, said output shaft being connected to and driving one of said drive members.

11. A reversible indexing system having a rotary angular input movement of greater than 180° and less than 360° and an output movement reaching zero velocity at each end of the stroke independent of input velocity comprising:

(a) a frame, (b) an output member mounted in said frame for movement along a substantially linear path, (c) a reversible rotary prime mover having an output shaft with an angular output movement about a first axis of greater than 180° and less than 360° and mounted in said frame for movement along a path substantially parallel to said drive surface of said output member, (d) a rotating drive member in tangential driving engagement with said output member mounted on said shaft of said reversible rotary prime mover and concentric about said first axis, (e) an eccentric member mounted to said rotating drive member and concentric about a second axis displaced from said first axis, and (f) means connecting said eccentric member and said frame and guiding said eccentric member along a path substantially transverse to the linear path of said output member.

12. A reversible indexing system having a rotary angular input movement of greater than 180° and less than 360° and an output movement reaching zero velocity at each end of the stroke independent of input velocity comprising:

(a) a frame, (b) an output member mounted in said frame for movement along a substantially linear path, (c) a reversible rotary prime mover having an output shaft with an angular output movement about a second axis of greater than 180° and less than 360° and mounted in said frame for movement along a path substantially transverse to said drive surface of said output member, (d) an eccentric member mounted to said shaft of said rotary prime mover to rotate about said second axis, (e) a rotating drive member concentric about a first axis and mounted to said eccentric member with said second axis displaced from said first axis and in tangential driving engagement with said output member, and (f) means positioning said output member and said rotating drive member for a driving engagement and guiding said rotating drive member along a path substantially parallel to said drive surface of said output member.

13. A reversible indexing system having a rotary angular input movement of greater than 180° and less than 360° and a rotary output movement reaching zero velocity at each end of its stroke independent of input velocity comprising:

(a) a frame, (b) an output member mounted in said frame for rotation about an output axis and adapted for tangential driving, (c) a first rotating drive member adapted for tangential driving and rotating about a first axis, (d) flexible drive means in driving engagement with said output member and driven engagement with said first rotating drive member, (e) a link member rotatably connected at one end to the center of said output member and rotatably connected at its other end to the center of said first rotating drive member thereby positioning said output member and said first rotating drive member for a driving connection by said flexible drive means, (f) a second rotating drive member eccentrically mounted to said first rotating drive member and rotating about a second axis displaced from said first axis, (g) means connecting said second rotation drive member and said frame and guiding said second rotating drive member along a path substantially transverse to the path of said flexible axis, and (h) a reversible rotary prime mover having an output shaft with an angular output movement greater than 180° and less than 360°, said shaft being connected to and driving one of said rotating drive members.

14. A reversible angular output indexing system having a rotary angular input of greater than 180° and less than 360° with said angular output movement reaching zero velocity at each end of its stroke independent of input velocity comprising:

(a) a frame, (b) an output gear mounted in said frame for rotation about an output axis, (c) first rotating drive means comprising a gear member concentric with and rotating about a first axis and in driving engagement with said output gear, (d) means positioning said output gear and said gear member for a driving engagement and guiding said first rotating drive means along an arcuate path equidistant from the pitch line of said output gear, (e) second drive means eccentrically mounted to said first rotating drive means and concentric about a second axis displaced from said first axis, (f) means connecting said second drive means and said frame and guiding said second drive means along a path substantially transverse to the pitch line of said output gear, and (g) a reversible rotary prime mover having an output shaft with an angular output movement greater than 180° and less than 360°, said shaft being connected to and driving one of said drive means.

15. A mechanism as in claim 14 in which said means connecting said second drive means and said frame comprises a link rotatably connected at one end to said second drive means and rotatably connected at its other end to said frame.

16. A mechanism as in claim 14 in which said means connecting said second drive means and said frame comprises a sliding connection between said second drive means and said frame.

17. A reversible angular output indexing system having a rotary angular input of greater than 180° and less than 360° with said angular output movement reaching zero velocity at each end of its stroke independent of input velocity comprising:

(a) a frame, (b) an output gear mounted in said frame for rotation about an output axis, (c) a link member rotatably mounted to said output gear concentric about the center of said output gear, (d) a reversible rotary prime mover having an output shaft with an angular output movement about a first axis of greater than 180° and less than 360° and mounted on said link member, (e) a drive gear mounted on said prime mover output shaft concentric about said first axis and in driving engagement with said output gear, (f) an eccentric member mounted in fixed relationship with said drive gear and concentric about a second axis displaced from said first axis, and (g) means connecting said eccentric member and said frame and guiding said eccentric member along a path substantially transverse to the pitch line of said output gear.

18. A reversible angular output indexing system having a rotary angular input of greater than 180° and less than 360° with said angular output movement reaching zero velocity at each end of its stroke independent of input velocity comprising:

(a) a frame, (b) an output gear mounted in said frame for rotation about an output axis, (c) first rotating drive means comprising a gear member concentric with and rotating about a first axis and in driving engagement with said output gear, (d) means positioning said output gear and said gear member for a driving engagement and guiding said first rotating drive means along an arcuate path equidistant from the pitch line of said output gear, (e) a reversible rotary prime mover having an output shaft with an angular output movement about a second axis of greater than 180° and less than 360° and mounted in said frame for movement along a path substantially perpendicular to the pitch line of said output gear, and (f) means mounting said gear member eccentrically to said prime mover output shaft with said first axis displaced from said second axis.

19. A reversible angular output indexing system having a rotary angular input of greater than 180° and less than 360° with said angular output movement reaching zero velocity at each end of its stroke independent of input velocity comprising:

(a) a frame, (b) an output gear mounted in said frame for rotation about an output axis, (c) first rotating drive means comprising a gear member concentric with and rotating about a first axis and in driving engagement with said output gear, (d) means positioning said output gear and said gear member for a driving engagement and guiding said first rotating drive means along an arcuate path equidistant from the pitch line of said output gear, (e) a four bar linkage comprising:
  (1) a base link comprising a portion of said frame,
  (2) a first pivoted link, pivotally connected at its inboard end to said base link,
  (3) a second pivoted link, pivotally connected at its inboard end to the other end of said base link,
  (4) an output link pivotally connected at its one end to the outboard end of said first pivoted link and pivotally connected at its other end to the outboard end of said second pivoted link, (f) a reversible rotary prive mover having an output shaft with an angular output movement about a second axis of greater than 180° and less than 360° and mounted on said output link of said four bar linkage for movement along a path substantially perpendicular to the pitch line of said output gear, and (g) means mounting said gear member eccentrically to said prime mover output shaft with said first axis displaced from said second axis.

20. A reversible angular output indexing system having a rotary angular input of greater than 180° and less than 360° with said angular output movement reaching zero velocity at each end of its stroke independent of input velocity comprising:
(a) a frame,
(b) an output gear mounted in said frame for rotation about an output axis,
(c) a first link member rotatably mounted to said output gear concentric about the center of said output gear,
(d) a reversible rotary prime mover having an output shaft with an angular output movement about a first axis of greater than 180° and less than 360° and rotatably mounted on said first link member about said first axis,
(e) a second link member pivotally mounted at its one end to said frame,
(f) a reaction link member mounted to said prime mover and pivotally connected to the other end of said second link member,
(g) a drive gear member on said prime mover output shaft concentric about said first axis and in driving engagement with said output gear,
(h) an eccentric member mounted in fixed relationship with said drive gear and concentric about a second axis displaced from said first axis, and
(i) means connecting said eccentric member and said frame and guiding said eccentric member along a path substantially transverse to the pitch line of said output gear.

21. A reversible angular output indexing system having a rotary angular input of greater than 180° and less than 360° with said angular output movement reaching zero velocity at each end of its stroke independent of input velocity comprising:
(a) a frame,
(b) an output gear concentric about an output gear axis and mounted in said frame for rotation about an output axis, with said output gear axis displaced from said output axis,
(c) first rotating drive means comprising a gear member concentric with and rotating about a first axis and in driving engagement with said output gear,
(d) means positioning said gear member and said output gear for a driving engagement and guiding said first rotating drive means along an arcuate path equidistant from said output gear axis,
(e) second drive means eccentrically mounted to said first rotating drive means and concentric about a second axis displaced from said first axis,
(f) means connecting said second drive means and said frame and guiding said second drive means along a path substantially transverse to the pitch line of said output gear, and
(g) a reversible rotary prime mover having an output shaft with an angular output movement greater than 180° and less than 360°, said shaft being connected to and driving one of said drive means.

* * * * *

UNITED STATES PATENT AND TRADEMARK OFFICE
CERTIFICATE OF CORRECTION

PATENT NO. : 4,244,233
DATED : January 13, 1981
INVENTOR(S) : John H. Brems

It is certified that error appears in the above-identified patent and that said Letters Patent are hereby corrected as shown below:

Col. 19, Line 7, change "rotation" to -- rotating --.

Col. 19, Line 10, change "flexible" to -- first --.

Signed and Sealed this

Twenty-eighth Day of July 1981

[SEAL]

Attest:

GERALD J. MOSSINGHOFF

Attesting Officer

Commissioner of Patents and Trademarks